WILSON AGER.
GRAIN-CLEANER
4451 [redacted] REISSUED JUL 4 1871 [redacted]
Fig: I
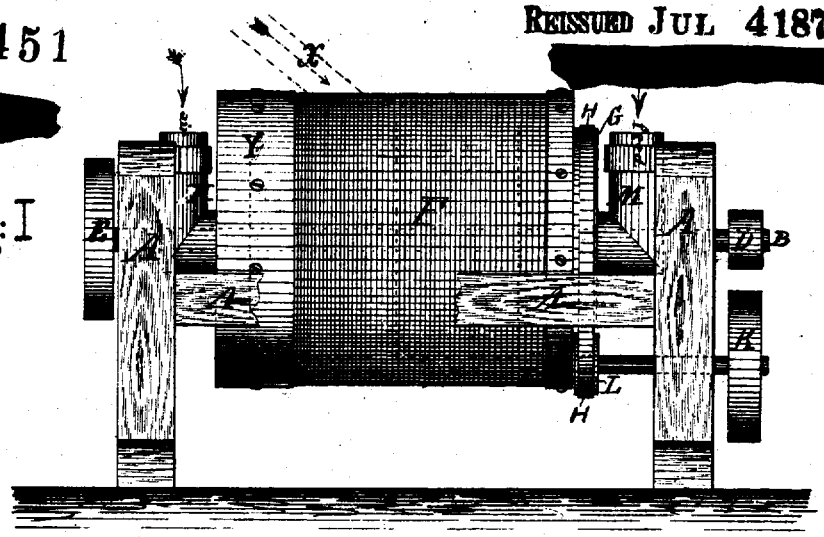
Fig. II
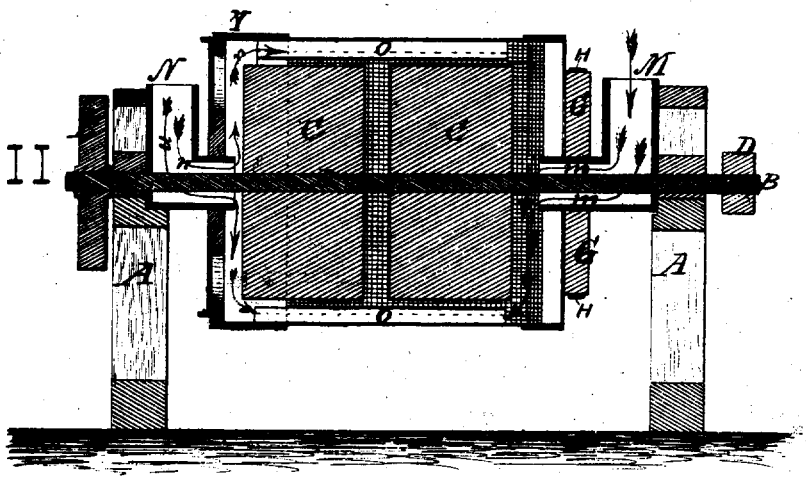
Attest
P. Moore.
Daniel Breed
Inventor
Wilson Ager

WILSON AGER.
GRAIN-CLEANER.
Fig IV
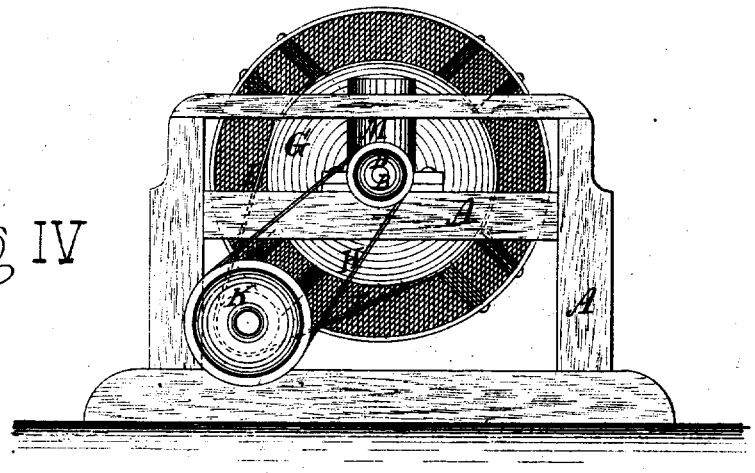
Fig III
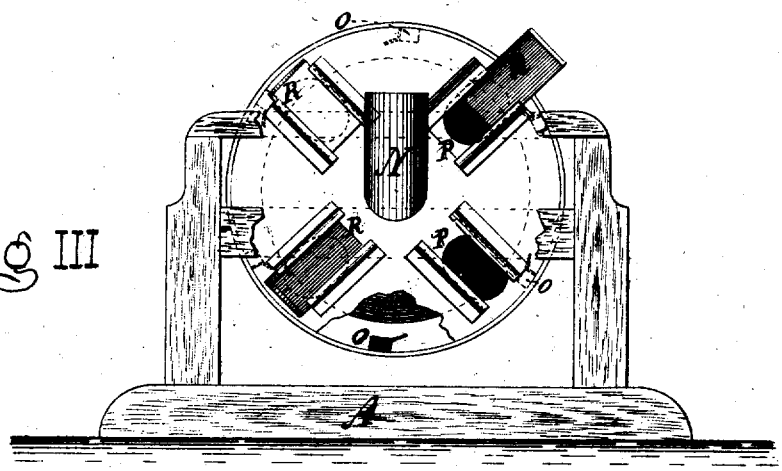
Attest
R McCann
Daniel Breed
Inventor
Wilson Ager

UNITED STATES PATENT OFFICE.

WILSON AGER, OF WASHINGTON, DISTRICT OF COLUMBIA.

IMPROVEMENT IN PROCESSES FOR DECORTICATING GRAIN.

Specification forming part of Letters Patent No. 92,556, dated July 13, 1869; reissue No. 3,788, dated January 11, 1870; reissue No. 4,451, dated July 4, 1871.

DIVISION A.

*To all whom it may concern:*

Be it known that I, WILSON AGER, of Washington, in the District of Columbia, have invented certain new and useful Improvements in the Art of Decorticating Grain; and I do hereby declare that the following is a full, clear, and exact description of the same.

My improvement in the process of decorticating grain consists in repeatedly abrading the surface of the grain and cooling it in alternate succession.

In carrying out my invention I prefer to use the machine figured in the drawing hereto annexed, which is the subject of another application of even date herewith, to which reference is made for a more full and complete description of said machine.

Figure 1 is a side elevation of the machine. Fig. 2 is a longitudinal section of the same. Fig. 3 is a detached view of the screen, showing the discharge-openings and slides; and Fig. 4 is an end view of the machine.

The same letters are employed in all the figures in the designation of identical parts.

In the annexed drawing, A indicates a frame, upon which is placed a horizontal shaft, B, carrying two stones, C, and provided with two pulleys, D and E, or two gear-wheels. Upon this shaft is the screen F, having journals separate from those of the stones and main shaft, and a pulley or gear-wheel, G. Power is applied to the pulley or gear-wheel D, setting in motion the shaft A, stones C, and pulley or gear-wheel E—say about one hundred and eighty revolutions per minute. By means of the bands H and I, and the pulleys or gear-wheels K, L, and M, a slower motion is transmitted to the screen—say about thirty revolutions to the minute—or the screen may be revolved in the direction opposite to the stones if desired. The grain is fed in through the tube M, as indicated by the arrow *m*. The grain spreads through the machine and is raised by elevators O. A constant blast of air is brought into the machine, as indicated by the arrow *n*, or in any other suitable manner, to blow out of the machine all the separated pellicle and dust as soon as they are detached from the kernels, and, at the same time, to cool the grain separated by the elevators, so as to be subject to the action of the blast or current of air. When the decortication is completed the grain is discharged through openings P, Fig. 3, provided with adjustable slides R.

It will be seen that the grain fed into the machine lies against the sides and peripheries of the stones with a pressure due only to its weight. It will also be seen that the grain is repeatedly carried away from the abrading action of the stones and is dropped into the space through which the current of air is passing, so that the grain is cooled by air passing through or around it as it drops to be again acted upon by the stones.

I do not claim herein the machine or any part of it, having made claims to my improvements in said machine in another application of even date herewith. Neither do I wish to limit the carrying out of this invention by means of the machines described herein, but propose to use any convenient means for carrying out my improvements in the art of decorticating grain herein described.

What I claim as my invention, and desire to secure by Letters Patent, is—

The improved process of decorticating grain by repeatedly abrading the surface of the grain and cooling it in alternate succession, substantially in the manner as hereinbefore set forth.

In testimony whereof I have signed my name to this specification before two subscribing witnesses.

WILSON AGER.

Witnesses:
R. MASON,
DANIEL BREED.